United States Patent Office 3,052,043
Patented Sept. 4, 1962

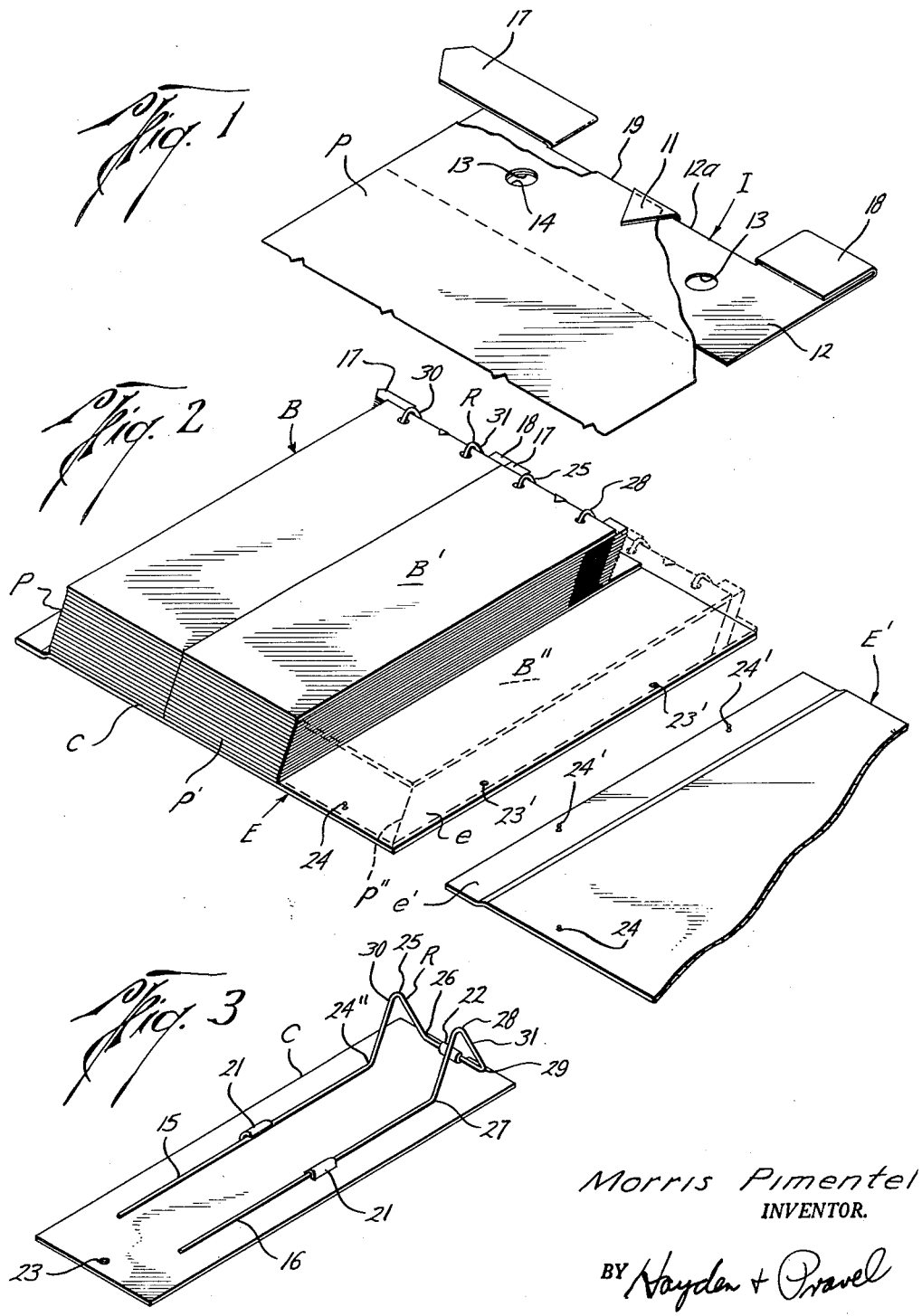

3,052,043
DISMANTLEABLE TRANSLATION BOOK AND
METHOD OF USING SAME
Morris Pimentel, Houston, Tex., assignor to Universal Multi-Lingual Enlightenment, Inc., a corporation of Texas
Filed Dec. 16, 1960, Ser. No. 76,361
4 Claims. (Cl. 35—35)

The present invention relates to a new and improved means for interlocking and interrelating lingually diverse, textually synonymous books and more particularly to a dismantleable translation book and the method of using same.

The foreign language vocabulary dictionary having four columns of vocabulary is normally used and is the most common aid in translating from one language to another. For example, if the two languages in which one is presently interested are English and French, the dictionary has one section which includes a column of English vocabulary alphabetically listed and opposite which is a column giving the French version of the English words listed. A second section of the dictionary has a column listing the French vocabulary in alphabetical order and opposite which is a column giving the English version thereof. Should a third language, such as Spanish, for example, be injected to the translation problem, a second dictionary, also having four columns and similar to the English-French, French-English dictionary hereinabove, but having a Spanish vocabulary in lieu of the French vocabulary, is employed. Eight columns of vocabulary are now necessary to correlate the three languages. Even the use of these eight columns does not permit one to translate directly from French to Spanish or from Spanish to French. It is necessary to first translate the Spanish or French word into English and then translate the English word into the French or Spanish word, respectively, as the case may be. Of course, one can add a French-Spanish and Spanish-French dictionary, but the number of columns has now been increased to twelve. The problem of translation is further increased as there is no interrelation between any two dictionaries. Each additional language desired to be translated requires at least a four column vocabulary similar in form to the above English-French and English-Spanish dictionaries but substituting another language for the French or Spanish.

The device of the present invention reduces the number of columns needed to one per language no matter how many different languages may be desired to be translated. This is readily exemplified, wherein in order to translate twenty diverse languages, each reciprocal with each other, 190 four-column bilingual books, aggregating 760 columns, are currently necessary. The device of the present invention because of its interrelating and interlocking features requires only twenty lingually diverse books of one column each to do the interlingual work of the aforesaid 760 columns.

It is therefore an important object of the present invention to provide a new and improved means and method of translating languages by correlating and interrelating such languages by a single book of each.

Another object of the present invention is to provide a new and improved translation book, utilizing a single column, which may be interlocked and interrelated with a plurality of other similar translation books of lingually diverse languages.

Still another object of the present invention is to provide a new and improved translation book which may be quickly assembled and as readily dismantled or disassembled and which has a plurality of loose-leaf pages which may be interlocked with corresponding or mateable pages in a similar translation book of another language.

A further object of the present invention is to provide a new and improved dismantleable translation book wherein a plurality of such books, each pertaining to a separate language, may be interlocked and each book is correlated and interrelated with all of the other books, each with each reciprocally, whereby a person may quickly translate from any one language of one book to any other language of any of the other books.

A still further object of the present invention is to provide a new and improved method whereby a person can quickly translate from one language to another diverse language.

Yet a further object of the present invention is to provide a new and improved dismantleable translation book wherein the leaves of one book may be interlocked with the leaves of another book similarly constructed.

Yet a further object of the present invention is to provide a new and improved dismantleable translation book wherein a plurality of such books may be interlocked each with each other and thus opened compositely.

An important object of the present invention is to provide a means for breaching oral language barriers between unilingual peoples wherein the number of pages and lines or paragraphs of one translation book points the route for lingually diverse conversation in another of such translation books.

The construction and method designed to carry out the invention will be hereinafter described, together with other features thereof.

The invention will be more readily understood from a reading of the following specification and by reference to the accompanying drawings forming a part thereof, wherein an example of the invention is shown, and wherein:

FIG. 1 is an isometric view of one form of an interlocking clip or paper holder comprising a part of the present invention;

FIG. 2 is an isometric view illustrating a plurality of dismantleable translation books interlocked together and an extension member for indefinitely increasing the number of such books to be interlocked together;

FIG. 3 is an isometric view illustrating the base or binder for one of the dismantleable books of the present invention;

Figure 4:
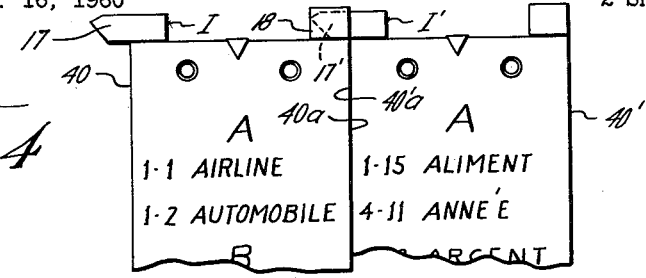
FIG. 4 is a plan view illustrating a partial page from the alphabetical section of an English dismantleable translation book interlocked with a corresponding partial page from the alphabetical section of a French dismantleable translation book.

Referring now to the drawings, the device of the present invention is seen to include a plurality of dismantleable translation books designated at B, B' and B" which are supported on a base or support member E which may in turn be connected or interlocked with a similar support member or base E'. The base E' illustrates an extension member and can be of any desired length so as to accommodate a predetermined number of books. Each individual dismantleable translation book includes a bottom cover or support means C, which can more easily be seen in FIG. 3. The support member C has a releasable retaining means R attached thereto which is adapted to receive the individual looseleaf pages or leaves P comprising the book B. Each page of each dismantleable translation book has an interlocking clip or clamp member I fastened thereto which is adapted to be received by the retaining means R and which is adapted to be interlocked with similar interlocking members of another dismantleable translation book, as will be explained more in detail hereinafter.

The interlocking member I, as more clearly seen in FIG. 1, includes a retaining member 11 for clamping or securing a page P on the base 12 of the member I. Suitable openings 13 corresponding to similar openings 14 in the leaf or page P are placed in the base 12 of the interlocking member I for positioning on each of the prongs 15 and 16 of the retaining means R. A projecting or laterally extending member 17, preferably formed integrally with the member I, extends or projects from one side of the member I, and a slot member 18, also preferably formed integrally with the member I is aligned with the member 17 and on the opposite side of the member I. The extending member 17 is adapted to be inserted in or positioned in a slot similar to the slot 18 in another interlocking member identical with the interlocking member I. FIG. 4 shows the clamp I in interlocking relationship with the clamp I'.

The interlocking member I can easily be manufactured from a single strip of metal or other suitable material. In the preferred form of the invention, the interlocking members I are precision made of a material such as stainless steel, wherein the dimensions of each interlocking member I used in the construction of the dismantleable translation books which are to be interrelated with each other as will be explained in detail hereinafter, are identical. In the preferred form of the invention the width of the page P is substantially identical with the width of the base 12 of the interlocking member I and the upper edge 19 of the page P coincides with the upper edge 12a of the interlocking member I. This enables each of the pages P of the translation book B to be placed adjacent and interlocked with each of the pages P' of the book B' or with other similar pages of other books. It can easily be seen that as many books as desired may be placed adjacent each other and interconnected with each other.

It should be noted that each of the individual dismantleable translation books which are to be used in correlation and interrelation with each other should be of substantially the same dimensions, and preferably texturally synonymous with each other. Thus, such books are substantially identical with each other with the exception of the specific language which may be used therein.

The base cover C has a pair of clips or clamps 21 positioned thereon which are adapted to receive the prongs 15 and 16 of the retaining member R. A similar clamp member 22 is positioned at the upper end of the base cover C also for retaining the member R. The bottom cover C has an opening or slot 23 arranged thereon which is adapted to be positioned on a suitably indexed and appropriately arranged pin or projection 24 on the base members E and/or E'. This arrangement enables each of the dismantleable translation books to be quickly and easily positioned on and locked on the base member E or E' and also to be quickly released therefrom when desired. Such slot and pin arrangement is preferably that of the friction type of snap-on members, but any suitable connection means may be used as desired.

The extension member E' has additional pins 24' positioned on one side thereof, which is viewed as the left side in FIG. 2, which are adapted to be positioned in suitable holes or openings 23' along one side of the base or support member E. A single pin 24' may be used if desired and accordingly the pin 24' may be positioned in a single opening 23' in the base E. The openings 23' are on the right side of the support member E, as viewed in FIG. 2. The extension member E' may be of any predetermined width, but is preferably in such widths as to accommodate a substantially specific number of translation books. The extension support member E' also has a plurality of holes along its right side, similar to the holes or openings 23' of the base member E.

In order that the translation books may be supported in the same general plane, the left edge e' of the extension member E' is depressed so that a portion e of the base E will rest thereon. A substantially continuous surface is thereby formed when the two support members E and E' are joined together by the insertion of the pins 24' in the holes 23'.

The relationship of the pins 24' to the holes 23' is preferably such that when the pins 24' are inserted in the holes 23', they do not protrude or extend above the surface of the support member E. This arrangement enables the surface of the base E to be substantially continuous and unobstructed, except for the pins 24 for holding the books B, B' and B''. This same pin and hole relationship is also preferably used with the pins 24 and the holes 23. Thus, the pins 24 do not protrude above the upper surface of the cover C and therefore do not interfere with the pages P.

Each of the prongs 15 and 16 of the page holder R has suitable bends 24'', 25 and 26 and 27, 28 and 29 on each side respectively thereof which form the approximately U-shaped or V-shaped members 30 and 31 which support or hold the pages P. The diameter of the retaining member R or prongs 15 and 16 is just slightly less than the openings 13 and 14 in the interlocking member I and the page P, respectively. This enables the pages P to be freely moved up and over the U-shaped or V-shaped members 30 and 31 and also provides for a minimum of longitudinal movement of the pages P, thereby enabling the interlocking members I of one book to fit precisely with the interlocking members I' of another book.

FIG. 4 best illustrates the interlocking of the pages of a pair of translation books. The projecting member 17' of the clip I' of the page 40' is inserted into the slot 18 of the clip I of the page 40. The right edge 40a of the page 40 is also adjacent the left edge 40a' of the page 40'. The interlocking of the pages can also be viewed in FIG. 2, wherein the pages P of the book B are interlocked with the pages P' of the book B'. The interlocking of the pages P'' of the book B'' with the pages P' of the book B' may also be seen.

It should also be noted that the translation books B and B' as well as book B'' and other similar translation books which may be joined therewith are preferably interlocked with each other prior to the positioning and locking of such books on the base or support member E or on the extension member E'. Once such books are interlocked together they may be easily positioned on and locked in place on the base members E and E'.

Referring now to FIGS. 4–7 of the drawings, samples of pages from a composite dismantleable translation book are illustrated, with the page 40 on the left being taken from the dismantleable translation book B written in English and the pages on the right being taken from a dismantleable translation book written in French. FIG. 4 illustrates the upper portion of a page 40 from the English book B and the upper page 40' of the French book B'. It can easily be seen that the sides 40a of the page 40 and sides 40a' of the page 40' are placed or positioned adjacent each other.

Each of the pages 40 and 40' taken respectively from the books B and B' are illustrative of the first page of the alphabetical index of each book. The numbers to the left of the words or vocabulary indicate the corresponding page and line on which the word will be found in the alpha-numerical section of the same or another book which will be explained hereinafter. For example, referring to page 40, which is in English, the word "airline" will be found on page one, line one of the alpha-numerical section, and the word "automobile" will be found on page 1, line 2 of such alpha-numerical section. In the English book, the words "airline" and "automobile" will of course be the same; however, in the French book the correct translation of the aforementioned English words will be translated into French. Thus on page 1, lines 1 and 2 of the alpha-numerical section of the French book B' appear the French words "ligne aerienne" and "automobile," respectively. This correlation and interrelation between languages is retained throughout regardless of the language used. On page 1, lines 1 and 2 of the alpha-numerical section of a Spanish book will appear the appropriate Spanish translation of the English words "airline" and "automobile."

Figure 5:
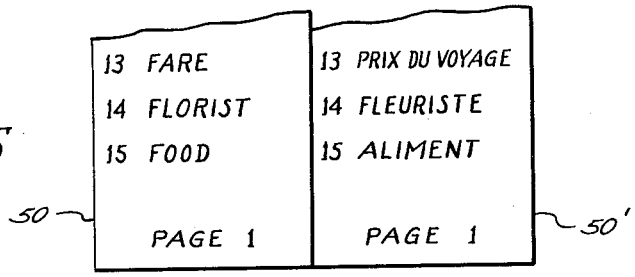
FIG. 5 is a plan view illustrating partial pages from each of the pages numbered one in the English and French alpha-numerical sections of their respective books.

The listing of the words of the vocabulary is in true alphabetical order. This is also true when using another language, such as French, as can be seen on page 40' of the book B'. The numerals appearing to the left of the French words likewise, identify the page and line on which such words may be found in the alpha-numerical section of the book B'. For example, the word "aliment" may be found on page 1, line 15 of the alpha-numerical section of any of the interrelated books in the language of such book. Referring to FIG. 5, on line 15 of page 1 of the alpha-numerical section of the English book B appears the English word "food," the correct translation of the French word "aliment." The word "annee" will be found on page 4, line 11 of the alpha-numerical section of the French book B' and its English equivalent on a corresponding page and line in the alpha-numerical section of the English book B. One of the important features of the present invention is the providing for a complete interrelation and correlation with the books B and B' of the different languages. For example, if one wishes to translate the English word "airline" to French, it is merely necessary to look on page 1, line 1 of the alpha-numerical section of the French book. Likewise, if one wishes to translate from the English word "automobile" to the French, it is merely necessary to look in the alpha-numerical section of the French book B' on page 1, line 2. Conversely, should one desire to look up the translation of the French "aliment" to English, it is merely necessary to look on page 1, line 15 of the alpha-numerical section of the English book B. Also, the English translation of the French word "annee" may be quickly and easily found on page 4, line 11 of the alpha-numerical section of the English book. In short, the numbers appearing to the left of each of the words in any index become a universal alpha-numerical sequence which may be correlated with the alphabetically diverse indexes of all languages.

It can easily be seen that the device of the present invention provides a composite translation book which is comprised of a plurality of single or unicolumn interlockable books, such as B and B' which may be mated with other single or unicolumn interlockable books as desired, therefore yielding a multiplicity of lingual contrast uniquely generative of spontaneous multilingual comprehension.

Referring to FIG. 5, pages 50 and 50', taken respectively from the English book B and the French book B', illustrate a partial page of the alpha-numerical section of each of the respective books. In the alpha-numerical section, the words are interrelated by page and line and it can easily be seen that the English word "fare" is translated into the French word "prix du voyage." Likewise the English word "florist" is translated into the French word "fleuriste," and the English word "food" is translated into the French word "aliment."

As English is used as the base language in the instant illustration, the listing of the English words in the alphabetical index and the alpha-numerical index is identical, i.e., the English words in the alpha-numerical section are also listed alphabetically. This is just a matter of convenience and the words of the alpha-numerical section may be arranged in any order desired. There must be a relationship between the words of one language in one alpha-numerical section and the words of another language in another alpha-numerical section. It can be appreciated that any language may be used as a base for the translation of all the other languages.

Figure 6:
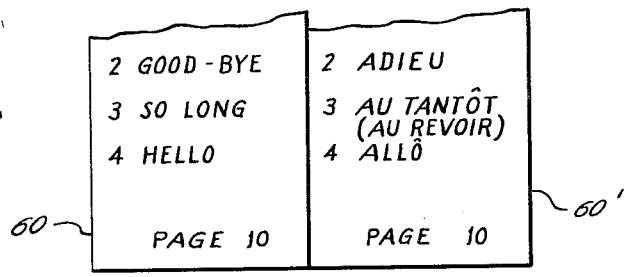
FIG. 6 is a plan view illustrating partial pages from each of the pages numbered ten in the English and French "Everyday Phrase" section of their respective books.
Figure 7:
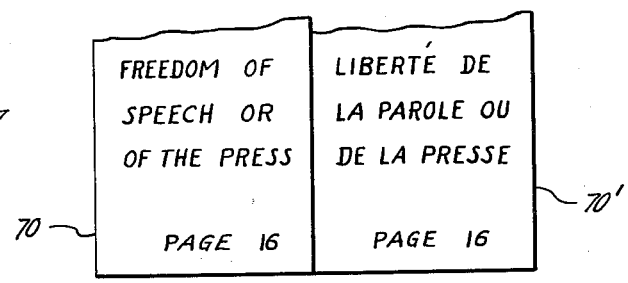
FIG. 7 is a plan view illustrating partial pages from each of the pages numbered 16 in the English and French "Reader" section of their respective translation books.

Referring again to FIG. 4, which illustrates a portion of the alphabetical index section of each of the English and French books, B and B', it is readily observed that the words do not translate from the page of one language to the page of another language in the same manner as illustrated in FIGS. 5, 6 and 7. This results from the fact that no two languages have identical alphabetical listings. The word listing or vocabulary listing in the English alphabetical and numerbetical sections is identical. For example, page 1, line 1 of each of the alphabetical and alpha-numerical sections list the word "airline." The alpha-numerical listing of the French words will be in accordance with their translation from the English words and is clearly illustrated in FIG. 5 wherein in a portion of page 1, each of the alpha-numerical sections of their respective English and French books is illustrated, wherein page 1, line 15, the English word "food" is found to be translated on page 1, line 15 of the alpha-numerical section of the French book to be the French word "aliment." It should also be noted (see FIG. 4) that the alphabetical listing of the French page 40' shows that the word "aliment" may be found on page 1, line 15 of any of the translation books. Referring to page 1, line 15 of each of the English and French books, the word "food" and the word "aliment" are quickly and easily found.

FIG. 6 illustrates the partial pages 60 and 60' taken from their respective English and French books, B and B' and illustrate how the dismantleable translation books may be used to translate everyday phrases. It can easily be seen that the French translation "adieu" of the English phrase "goodbye" appears on the identical page and line on which the English word "goodbye" appears in the English book. A person may quickly go from one book to another, regardless of whether he is translating from English to French or from French to English.

FIG. 7 illustrates a partial page 70 from the English book B and a partial page 70' from the French book B' taken from a reader section of the books. In such a reader section, it is not necessary that each of the lines be numbered, but the relationship of page and line number is still maintained throughout, as can easily be seen in the illustration of FIG. 7.

From the foregoing, it can be seen that this invention provides a means for interlocking and thus interrelating, lingually diverse, textually synonymous books. When such books are interlocked via their covers and leaves as illustrated hereinabove, the books become a composite translation book which is multilingual and features the lingually diverse books of one's choice. Additionally, the books are dismantleable (i.e., may be disassembled), transpositionally convertible and lingually changeable at a user's option. The subject matter of the text(s) is incidental and may consist of vocabulary, phrases, dialogue, combinations of each or any other intelligence as desired. The number of leaves or pages of a particular book is likewise incidental and such book may consist of as few or as many leaves as desired. It should be noted however that single, unicolumn books which are to be interlocked with other single, unicolumn books to thereby form the translation book, should have the identical number of pages and arrangement, so that when such books are interlocked with each other as previously explained they will be specifically interrelated and correlated.

It is believed that the use of the present invention is evident from the disclosure hereinabove. It should also be noted that numerous other specific applications of the present invention are possible. One such specific application is illustrated as follows: An American or English person is a tourist in France and desires to communicate or converse with a Frenchman. He merely gives the Frenchman, the dismantleable French book and keeps the English book correlated therewith. By a quick comparison of lines and pages of one book with the lines and pages of the other book, the American and Frenchman can translate the words of their respective languages to the words of the other language. Each can quickly find a word in the alphabetical section of his book which will immediately give him the page and line of the equivalent word in the other book. Thus a rapid means of communication is provided between two lingually diverse individuals.

From the foregoing, it can be appreciated that as many translation books of as many languages as desired may be used, and that the same system or arrangement of intelligence is carried throughout a group of books.

It should also be noted that the device of the present invention is not limited to the translation of foreign languages, but can be used in any instance where one form of intelligence is to be transferred into another form of intelligence. For example the books may be used in the field of science and mathematics for the presentation of tables or other desired intelligence.

The present invention provides a method of rapidly and easily translating diverse languages and a device for such use.

The device and method of the present invention provides a means for interlocking and interrelating, lingually diverse and textually synonymous books. When any two or more of such books are interlocked via their covers or binders and leaves as disclosed hereinabove they become a composite translation book being bilingual, trilingual, quadrilingual, and multilingual as desired, depending upon the number of such books interlocked together.

It can be appreciated that the present invention provides a new, novel and revolutionary advance in the field of language translation. The present invention may be said to be to the world of people and languages what the automobile is to the world of horses and buggies. The present invention provides a rapid means of going to one language and quickly returning therefrom, reciprocally in a twinkling.

The foregoing disclosure and description of the invention is illustrative and explanatory thereof and various changes in the size, shape and materials, as well as in the details of the illustrated construction and in carrying out the method steps herein set forth, may be made within the scope of the appended claims without departing from the spirit of the invention.

What is claimed is:

1. A dismantleable book comprising, a plurality of loose leaves, a means for releasably retaining said plurality of leaves, and an interlocking means on each one of said plurality of loose leaves whereby each one of said plurality of loose leaves may be interlocked with each one of similar loose leaves in a similar dismantleable book, said interlocking means including a clamp member adapted to receive a leaf of said plurality of leaves, said clamp member having an extending member and a slot member whereby said extending member of said clamp member is adapted to be received by a slot member of another of said clamp members and said slot member of said clamp member is adapted to receive an extending member of another of said clamp members.

2. A composite translation book comprising, a support member, a plurality of dismantleable translation books adapted to be supported on said support member, each of said dismantleable translation books including a plurality of loose leaves, a means for releasably retaining said plurality of leaves, and an interlocking means on each one of said plurality of loose leaves for interlocking each of the plurality of loose leaves of each of the other of said dismantleable books thereby interlocking each of said dismantleable books with each of said other dismantleable books.

3. The structure recited in claim 2, including means for locking each of said dismantleable translation books on said support member.

4. The structure recited in claim 2, including an extension member for receiving and supporting additional dismantleable translation books, said extension member having means thereon for joining and locking said extension member to said support member, and said support member being adapted to receive said last named means.

References Cited in the file of this patent
UNITED STATES PATENTS

| 680,311 | Browne | Aug. 13, 1901 |
| 1,238,585 | Smith | Aug. 28, 1917 |
| 1,247,104 | Foster | Nov. 20, 1917 |
| 2,379,637 | Hoffman | July 3, 1945 |
| 2,579,915 | Flatin et al. | Dec. 25, 1951 |

FOREIGN PATENTS

| 149,455 | Austria | May 10, 1937 |
| 438,144 | France | Mar. 7, 1912 |
| 862,737 | France | Dec. 16, 1940 |
| 607,169 | Great Britain | Aug. 26, 1948 |